US007013600B1

(12) United States Patent
Bae et al.

(10) Patent No.: US 7,013,600 B1
(45) Date of Patent: Mar. 21, 2006

(54) METHOD AND APPARATUS FOR CULTURING BEAN SPROUTS IN WATER

(76) Inventors: Jun-woo Bae, Hyundae Apt. 102-1201, Dooam2-dong, Buk-gu, Gwangju-si (KR) 500-767; Jun-han Bae, Hyundae Apt. 102-1201, Dooam2-dong, Buk-gu, Gwangju-si (KR) 500-767

( * ) Notice: Subject to any disclaimer, the term of this patent is extended or adjusted under 35 U.S.C. 154(b) by 0 days.

(21) Appl. No.: 11/005,342

(22) Filed: Dec. 6, 2004

(51) Int. Cl.
*A01G 31/00* (2006.01)

(52) U.S. Cl. .......... 47/61

(58) Field of Classification Search .......... 47/60, 47/61, 59 R, 16, 14; 99/536; 426/106
See application file for complete search history.

(56) References Cited

U.S. PATENT DOCUMENTS 2,431,063 A * 11/1947 Scherer .......... 426/106
3,768,201 A * 10/1973 Yoo .......... 47/16
4,086,725 A * 5/1978 Li .......... 47/61
4,180,941 A * 1/1980 Korematsu .......... 47/14
4,551,942 A * 11/1985 Brown .......... 47/14
4,729,188 A * 3/1988 Cheng .......... 47/14
4,989,367 A * 2/1991 Chung .......... 47/61
6,363,656 B1 * 4/2002 Byun .......... 47/61

* cited by examiner

*Primary Examiner*—Francis T. Palo
(74) *Attorney, Agent, or Firm*—Volpe And Koenig, P.C.

(57) ABSTRACT

A method and apparatus for culturing bean sprouts in water are disclosed. A method for culturing bean sprouts in water according to the present invention comprises the steps of placing a quantity of beans into net bags; immersing the net bags of beans into a container of water; injecting air into the water of the container and maintaining the water temperature at about 20° C. while the net bags of beans are immersed in the water of the container; and renewing the water of the container at regular intervals. An apparatus for culturing bean sprouts in water comprises a container for holding water; a plurality of net bags for holding a quantity of beans capable of immersion in the container; nozzles for injecting air into the water of the container; and heaters and coolers for maintaining the water temperature at around 20° C.

4 Claims, 1 Drawing Sheet

16
17
water source
19
15
13
20
10
12
32
31
air
11
41
41
41
14
water drain
40
42

METHOD AND APPARATUS FOR CULTURING BEAN SPROUTS IN WATER

BACKGROUND OF THE INVENTION

1. Field of Invention

The present invention is related to a method and apparatus for culturing bean sprouts in water to facilitate the production and management of mature bean sprouts as well as to keep bean sprouts from spoiling by putting beans in culturing net bags, immersing them in water, injecting air into the water, sprouting beans, and culturing bean sprouts.

2. Prior Art

Bean sprouts can be cultivated regardless of location and season for a short time because beans can be sprouted with just water in 5–6 days in a dark place until their roots are approximately 10 cm long. They generate vitamin C, pantothenic acids, asparagine acids, and all kinds of amino acids while growing from seeds to sprouts, and for that reason they have high nutritional value.

Recently mass production of bean sprouts has been developed. These methods consist of placing beans in a container and sprinkling with water at regular intervals. However, bean sprouts are typically growing in circumstances of high temperature and humidity, darkness, and poor ventilation. It is a problem that the bean sprouts are spoiled by microorganism infection. *Pseudomonas* spp. and *Fusarium* spp. are known as putrefying bacteria of bean sprouts. These infecting microorganisms reproduce quickly and cause spoiling in cases where temperature of the growing room gets high. To prevent spoiling, mixing of sprouts while sprinkling water with or without chemicals on the beans has been tried. Mechanical mixing, however, causes bean sprouts to grow slowly. In addition, using chemicals is harmful to people.

In addition, in prior art, beans are cultivated in a container and transferred to a packaging container. The procedures of producing and transferring cultivated bean sprouts not only are very complicated but also cause damage to bean sprouts.

OBJECTS OF THE INVENTION

An object of the present invention is to provide a method and an apparatus for culturing bean sprouts in water.

Another object of the present invention is to provide a method and an apparatus to make it possible to produce and manage bean sprouts in a net bag by culturing them in small-sized net bags.

SUMMARY OF THE INVENTION

A method for culturing bean sprouts in water according to the present invention comprises the steps of: placing a quantity of beans into net bags; immersing said net bags of beans into a container of water; injecting air onto the water of said container and maintaining the water temperature at about 20° C. while said net bags are immersed in the water of said container; and replacing the water of said container at regular intervals. This method makes it possible to not only prevent developing sprouts from spoiling but also produce and manage bean sprouts in net bags.

In particular, the method for culturing bean sprouts in water according to this invention supplies a proper amount of air not to cause trouble to sprouting and growing and at the same time prevents waste caused by oversupply of unnecessary air by spraying air of 0.3~0.6 L per minute per liter of water.

An apparatus for culturing bean sprouts in water according to this invention comprises a container for holding water; a plurality of net bags for holding a quantity of beans capable of immersion in the container; means for injecting air to a water of said container; and means for maintaining the water temperature at around 20° C.

DETAILED DESCRIPTION OF THE PREPERRED EMBODIMENTS

Figure 1:
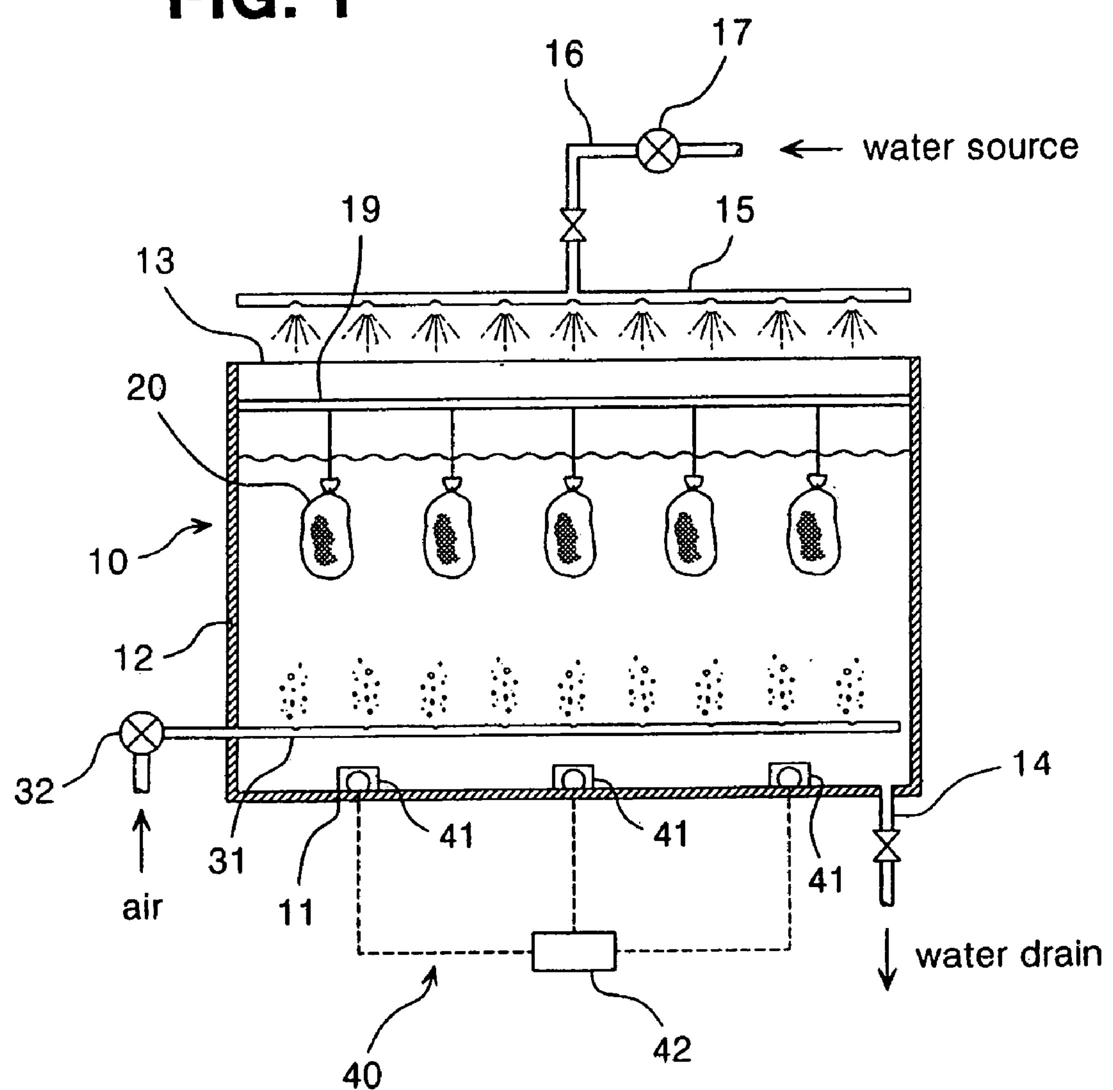
FIGURE 1 is a diagram of an apparatus for culturing bean sprouts in accordance with the present invention.

The apparatus for culturing bean sprouts in water according to this invention comprises a container 10 for holding water. The container 10 preferably has a square bottom 11, four walls 12, and an opening 13 on the upper part. The size of the container 10 is big enough to accept net bags 20 of beans to be immersed in the container 10. Inside the container 10, a plurality of nozzles 31 for injecting air into the water in the container 10, and coolers and heaters 41 to maintain the water temperature in the container 10 at around 20° C. are installed. To replace water in the container 10 at regular intervals, a water drain 14 is installed at the bottom 11 of the container 10. Above the opening 13 of the container 10, a plurality of water nozzles 15 are installed to supply water to the container 10. The water nozzles 15 are connected to water source by a pipe 16 and sprinkles water over the net bags of beans in the container until the bags are immersed. A bar 19 is horizontally installed to hang the net bags 20 in water.

The net bags 20 made with a small mesh net holds beans in the water. The net bags 20 are big enough to hold mature bean sprouts. For example, the net bags 20 can be made suitable for holding the amount of bean sprouts equivalent to 1 or 2 serving size. It makes it easy to produce and manage because the net bags themselves can be treated as a final product and may be sold without further packing.

Beans are seeds that sprout in proper air condition. Therefore, oxygen supply is needed for sprouting and culturing bean sprouts in the container 10. For this purpose, this invention provides means for injecting air 30 into the water of the container 10. The means for injecting air 30 comprises at least one nozzle 31 installed in the container 10 and an air pump 32 to supply air to the nozzles 31. The nozzle 31 injects air into the water generating bubbles supplying oxygen to the water of the container 10.

Beans typically sprout at 17° C.~30° C. and the higher the temperature in this range, the better the beans sprout and grow. On the other hand, the microorganism that affects bean sprouts reproduces easily at 23° C.~30° C. Therefore, the present invention, as a preferred embodiment, maintains the temperature of the container 10 at around 20° C. A means for maintaining the water temperature 40 is installed in the apparatus to maintain the water temperature in the container 10 at around 20° C. The means for maintaining the water temperature 40 comprises coolers and heaters 41 installed in the container 10 and a controller 42.

The method for culturing bean sprouts in water according to this invention is explained hereinafter. Beans are placed in net bags 20. The amount of beans in each net bag 20 is determined in consideration of production, management, and sales.

The net bags 20 of beans are immersed in water in the container 10.

Air is injected into the water in the container 10 while the net bags 20 are immersed in the water of the container 10.

The water temperature of the container 10 is maintained at around 20° C.

In the process of sprouting and growing a lot of organic substances are typically released in the water of the container 10, and this boosts the growth of the microorganism that causes bean sprouts to spoil. Therefore water is replaced on a regular basis in the process of sprouting beans and growing sprouts.

Sprouting beans and growing bean sprouts vary depending on the condition of culturing them, and so does the function of the microorganism involved in sprouts spoiling.

The following Experiment 1 was conducted to determine the characteristics of sprouting and growing and the effects on the degree of spoiling according to the amount of air supplied. The results are summarized.

(a) Chinese beans are used.

(b) underground water fit for drinking is used.

(c) beans of 200 g were placed in proper-sized net bags and fifteen net bags were immersed in a 150 L container.

(d) the water temperature was maintained at 20° C. and air was injected with different volume of air as follows: 0 L, 28 L, 56 L, 86 L per minute per liter of water.

(e) sprouting rate, root length, and incidence of bacteria were measured for 96 hours every 24 hours.

Sprouting rate, root length, and incidence of bacteria which resulted from Experiment 1 are summarized in Table 1.

In accordance with the results of the Experiment 1 when the supplied air volume increases, sprouting rate and root length are improved. Sprouting rate and root length are significantly improved when the condition of supplied air volume is increased from 0.3 L per liter of water per minute to 0.6 L/liter of water ·min. Although sprouting rate and root length were better, the improvement is not so substantial when the condition of air supply is over 0.6 L/water L·min.

Experiment 1 results didn't show any incidences of bean sprouts spoiled by bacteria in water.

TABLE 1

| Water temperature (° C.) | Cuturing time (hr) | Air supply (L/water L · min) | Sprouting rate (%) | Root length (Cm) | Incidence of bacteria (%) |
|---|---|---|---|---|---|
| 20□ | 24 hr | 0.0 | 0 | 0.0 | 0 |
| | | 0.3 | 3 | 0.1 | 0 |
| | | 0.6 | 39 | 0.2 | 0 |
| | | 0.9 | 48 | 0.3 | 0 |
| | 48 hr | 0.0 | 0 | 0.0 | 0 |
| | | 0.3 | 60 | 0.8 | 0 |
| | | 0.6 | 81 | 1.4 | 0 |
| | | 0.9 | 89 | 1.4 | 0 |
| | 72 hr | 0.0 | 7 | 0.3 | 0 |
| | | 0.3 | 78 | 1.4 | 0 |
| | | 0.6 | 93 | 2.9 | 0 |
| | | 0.9 | 94 | 2.5 | 0 |
| | 96 hr | 0.0 | 19 | 0.4 | 0 |
| | | 0.3 | 77 | 2.3 | 0 |
| | | 0.6 | 93 | 4.8 | 0 |
| | | 0.9 | 94 | 4.1 | 0 |

Experiment 2 was conducted in a condition that beans are immersed in ground water at 20° C. for 24 hours and sprouted in the air, and sprouting rate and root length are measured every 24 hours for 72 hours. The results of Experiment 2 are summarized in Table 2.

Results of Experiments 1 and 2 show that under the same condition in hours of work, sprouting rate and root length are overall better in water supplied with air.

TABLE 2

| Immersing condition | Sprouting hours in the air (hr) | Total hours of work (hr) | Sprouting rate (%) | Root length (Cm) |
|---|---|---|---|---|
| Immersed in 20° C. water during 24 hr | 24 | 48 | 5 | 0.2 |
| | 48 | 72 | 73 | 0.5 |
| | 72 | 96 | 88 | 1.3 |

The results of Experiment 1 and Experiment 2 revealed that culturing bean sprouts in water is better than culturing them in the air. In particular, Experiment 1 suggested that in the case where air is supplied at 0.3 L/water L-min on the water, beans sprouted and grew. In the range of air supplied at 0.6 L/water L·min, the increased supply of air has little effect. Thus, the preferred method for sprouting beans and growing bean sprouts in accordance with the present invention is injecting air of 0.3~0.6 L/water L·min into the water.

In addition, due to respiration of bean sprouts, fat and protein contained in beans are reduced in the process of growing. On the other hand, vitamin A and C are significantly increased in the process of culturing bean sprouts. In general, it is known that regular grains like brown rice contain Gamma Amino Butyric Acid (GABA) and sprouting increases GABA content. GABA is a nonprotein amino acid which consists in regular grains and in animals and plants, and is presented as a neural suppressant in the cerebellum of mammals. GABA is developed when carbon dioxide emits from glutamic acids. GABA is also contained in beans as in regular grains. Beans, however, are seeds that sprout in proper air condition. Thus, unlike regular grains, GABA content contained in beans is generally reduced as beans sprout and bean sprouts grow. This invention controls the supply of oxygen because beans sprout while immersed in water unlike that in the air. Therefore, there is a difference in GABA content contained in bean sprouts cultured in different conditions: culturing in water based on this invention; in the air; and in the water supplied with air. The following Experiment 3 is conducted to understand the difference of GABA content based on the culturing condition and the results are summarized Table 3.

(a) bean sprouts were cultured under the same condition as that of Experiment 1 and Experiment 2.

(b) To measure the GABA content, beans and dried bean sprouts cultivated under the different condition with liquid nitrogen were ground, the powder of 200 g of the mixture of methanol:chloroform:water (12:5:3) was mixed, and centrifuged (12000×g, 15 min, 4° C.), and liquid containing GABA was extracted. Then, a mixture of chloroform:water (3:5) was added to deposits separated from the first centrifugal, and extracted GABA remained in deposits for the second time. The first and the second liquid were combined and freeze-dried, the freeze-dried material was mixed in water of 0.1 mg, and filtered with a 0.45 $\mu$m PVDF filter, and the content of a sample extracted through filtering was analyzed.

Table 3 summarizes GABA content in bean sprouts under the different condition which resulted from Experiment 3. Table 3 suggests that bean sprouts cultivated from dried beans are relatively reduced in GABA content in sprouting both in water and in the air. Compared with sprouting in the air, sprouting in water generally has a greater GABA content and the less the supply of air, the greater GABA content. Particularly, in case of sprouting in water, GABA content is sharply reduced in the range of the supply of air between 0.3 L/water L·min and 0.6 L/water L·min, and the supply of air for 108 hours under 0.3 L/water L·min enables bean sprouts to have GABA content similar to that in dried beans. Therefore, the supply of air under 0.3 L/water L·min is best to cultivate functional bean sprouts high in GABA content.

TABLE 3

| Condition of work | | | GABA contents (mg/100 g) |
|---|---|---|---|
| Dried bean | | | 10.21 |
| Sprouted in 20° C. water | Hours of work (hr) | Air supply (L/water L · min) | |
| | 24 | 0 | 3.03 |
| | | 0.3 | 0.06 |
| | | 0.6 | 2.89 |
| | | 0.9 | 3.23 |
| | 72 | 0.0 | — |
| | | 0.3 | 5.88 |
| | | 0.6 | 3.87 |
| | | 0.9 | 3.52 |
| | 108 | 0.0 | — |
| | | 0.3 | 10.13 |
| | | 0.6 | 5.97 |
| | | 0.9 | 5.57 |
| Sprouted in the air after | Time in the air (hr) | | |
| immersed in | 24 | | 1.85 |
| 20° C. water | 108 | | 3.06 |

We claims:

1. A method for culturing bean sprouts in water comprising the steps of:

placing a quantity of beans into net bags;

immersing said net bags of beans in a container of water;

injecting air into the water of the said container and maintaining the water temperature at about 20° C. while said net bags of beans are immersed in the water of said container;

replacing the water of said container at regular intervals.

2. The method of claim 1 wherein the volume of air injected into the water of said container is in the range of about 0.3~0.6 L per minute per liter of water.

3. An apparatus for culturing bean sprouts in water comprising:

a container for holding water;

a plurality of net bags for holding a quantity of beans capable of immersion in said container of water;

means for injecting air into the water of said container; and means for maintaining the water temperature at around 20° C.

4. The apparatus of claim 3 wherein the volume of air injected into the water of said container is in the range of about 0.3~0.6 L per minute per liter of water.

* * * * *